US010140832B2

(12) United States Patent
Stout et al.

(10) Patent No.: US 10,140,832 B2
(45) Date of Patent: Nov. 27, 2018

(54) SYSTEMS AND METHODS FOR BEHAVIORAL BASED ALARMS (71) Applicant: FLIR Systems, Inc., Wilsonville, OR (US)

(72) Inventors: Arthur Stout, Goleta, CA (US); John Distelzweig, Santa Barbara, CA (US); Pieter Messely, Ronse (BE); Koen Janssens, Aaigem (BE); Vu Nguyen, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 19 days.

(21) Appl. No.: 15/297,891

(22) Filed: Oct. 19, 2016

(65) Prior Publication Data
US 2017/0213436 A1 Jul. 27, 2017

Related U.S. Application Data (60) Provisional application No. 62/287,336, filed on Jan. 26, 2016.

(51) Int. Cl.
G06K 9/00 (2006.01)
G08B 21/04 (2006.01)

(52) U.S. Cl.
CPC ..... G08B 21/0423 (2013.01); G06K 9/00335 (2013.01)

(58) Field of Classification Search
CPC .............. G08B 21/00335; G06K 9/00335
USPC ...................................................... 382/103
See application file for complete search history.

(56) References Cited

U.S. PATENT DOCUMENTS

| 6,462,663 | B1 | 10/2002 | Wilson et al. |
| 7,541,934 | B2 | 6/2009 | Fredriksson et al. |
| 7,567,200 | B1 | 7/2009 | Osterweil |
| 7,762,676 | B2 | 7/2010 | Daly |
| 7,985,953 | B2 | 7/2011 | Luterotti et al. |
| 8,115,641 | B1 | 2/2012 | Dempsey |
| 8,508,372 | B2 | 8/2013 | Cuddihy |
| 8,547,236 | B2 | 10/2013 | Gannot et al. |
| 2002/0084902 | A1 | 7/2002 | Zadrozny et al. |

(Continued)

FOREIGN PATENT DOCUMENTS

| EP | 1732314 | 12/2006 |
| FR | 2870378 | 7/2008 |

(Continued)

OTHER PUBLICATIONS

"im2bw", MathWorks, Sep. 16, 2015, 2 pages [online], [retrieved on Jan. 31, 2017]. Retrieved from the Internet: <URL:http://www.mathworks.com/help/images/ref/im2bw.html>.

(Continued)

Primary Examiner — Raj Chakraborty
(74) Attorney, Agent, or Firm — Haynes and Boone, LLP (57) ABSTRACT Various embodiments of the present disclosure may include an imaging system. The imaging system may include a controller that is adapted to determine behavior typical of an object within an environment. The imaging system may additionally monitor the object within the environment and detect when the object behaves anomalously within the environment. Upon detection of anomalous behavior, the controller may output an alarm and/or a response message.

20 Claims, 9 Drawing Sheets

(56) References Cited

U.S. PATENT DOCUMENTS

| | | | |
|---|---|---|---|
| 2003/0058111 | A1 | 3/2003 | Lee et al. |
| 2003/0058341 | A1* | 3/2003 | Brodsky ............ G06K 9/00335 |
| | | | 348/169 |
| 2005/0146429 | A1 | 7/2005 | Spoltore et al. |
| 2006/0220842 | A1 | 10/2006 | Breed |
| 2007/0229663 | A1 | 10/2007 | Aoto et al. |
| 2008/0062167 | A1 | 3/2008 | Boggs et al. |
| 2008/0186189 | A1 | 8/2008 | Azzaro et al. |
| 2008/0294462 | A1 | 11/2008 | Nuhaan et al. |
| 2009/0143045 | A1 | 6/2009 | Graves et al. |
| 2009/0265193 | A1 | 10/2009 | Collins et al. |
| 2009/0309723 | A1 | 12/2009 | Freebody et al. |
| 2010/0027835 | A1* | 2/2010 | Zhang ............... G06K 9/00362 |
| | | | 382/100 |
| 2010/0081411 | A1 | 4/2010 | Montenero |
| 2010/0111370 | A1 | 5/2010 | Black et al. |
| 2011/0231419 | A1* | 9/2011 | Papke ............... G06F 17/30793 |
| | | | 707/756 |
| 2012/0127306 | A1 | 5/2012 | Oh et al. |
| 2013/0184592 | A1 | 7/2013 | Venetianer et al. |
| 2013/0335550 | A1 | 12/2013 | Rochenski et al. |
| 2015/0154453 | A1 | 6/2015 | Wilf |
| 2015/0248754 | A1* | 9/2015 | Graner ............... G06K 9/00771 |
| | | | 382/103 |
| 2015/0312782 | A1* | 10/2015 | Amirijoo ............ H04W 24/00 |
| | | | 455/424 |
| 2017/0032534 | A1* | 2/2017 | Sullivan ............. G06T 7/0083 |

FOREIGN PATENT DOCUMENTS

| | | |
|---|---|---|
| JP | 2001/283348 | 10/2001 |
| WO | WO 2004/047039 | 6/2004 |
| WO | WO 2005/040779 | 5/2005 |
| WO | WO2007/107988 | 9/2007 |
| WO | WO 2007/139658 | 12/2007 |
| WO | WO 2010/055205 | 5/2010 |

OTHER PUBLICATIONS

"Binary Image Processing", Sep. 16, 2015, 2 pages [online], [retrieved on Jan. 31, 2017]. Retrieved from the Internet: <URL:http://homepages.inf.ed.ac.uk/rbf/CVonline/LOCAL_COPIES/MARBLE/medium/binary/>.

Petrakis, E.G.M., "Binary Image Analysis", Sep. 16, 2015, 30 pages [online], [retrieved on Jan. 31, 2017]. Retrieved from the Internet: <URL:http://www.intelligence.tuc.gr/~petrakis/courses/computervision/binary.pdf>.

"Binary image processing", Sep. 16, 2015, 2 pages [online], [retrieved on Apr. 20, 2017]. Retrieved from the Internet: <URL:https://www.google.com/search?q=binary+image+processing&espv=2&biw=1330&bih=913&tbm=isch&tbo=u&source=univ&sa=X&sqi=2&ved=0CD4QsARqFQoTCPX49N2SksYCFQlliAodxBwAlQ&dpr=1>.

"Homework 1 Binary Vision in Medical Image Analysis Assigned Oct. 4, 2010; Due Oct. 11, 2010 11:59pm", CSE 455: Computer Vision Autumn 2010, 3 pages [online], [retrieved on Jan. 31, 2017]. Retrieved from the Internet: <URL:https://courses.cs.washington.edu/courses/cse455/10au/assignments/hw1/>.

"X-ray imaging", Images, Google, Sep. 16, 2015, 2 pages [online], [retrieved on Jan. 31, 2017]. Retrieved from the Internet: <URL:https://www.google.com/search?q=xray+imaging&espv=2&biw=1330&bih=913&source=lnms&tbm=isch&sa=X&ved=0CAgQ_AUoA2oVChMIsc61kpCSxgIVBD6ICh25igBJ#imgrc=>.

"MRI imaging", Images, Google, Sep. 16, 2015, 2 pages [online], [retrieved on Jan. 31, 2017]. Retrieved from the Internet: URL:https://www.google.com/search?q=MRI+imaging&espv=2&biw=1330&bih=913&source=lnms&tbm=isch&sa=X&ved=0CAcQ_AUoAmoVChMly6mDspCSxgIVF1ulCh1s2Qto>.

"Binary image processing machine vision binary image processing infrared", Images, Google, Sep. 16, 2015, 2 pages [online], [retrieved on Apr. 20, 2017]. Retrieved from the Internet: <URL:https://www.google.com/search?q=binary+image+processing+machine+vision&espv=2&biw=1461&bih=827&source=lnms&tbm=isch&sa=X&sqi=2&ved=0CAYQ_AUoAWoVChMlu_WVmabcxwIVCVGICh1NXgYt&dpr=1#tbm=isch&q=binary+image+processing+infrared>.

Plotnikov et al., "Advanced image processing for defect visualization in infrared thermography", Mar. 26, 1998, 8 pages [online], [retrieved on Jan. 31, 2017]. Retrieved from the Internet: <URL:https://ntrs.nasa.gov/archive/nasa/casi.ntrs.nasa.gov/20040110685.pdf>.

"Binary image privacy", Google, Sep. 16, 2015, 2 pages [online], [retrieved on Apr. 20, 2017]. Retrieved from the Internet: <URL:https://www.google.com/webhp?sourceid=chrome-instant&ion=1&espv=2&ie=UTF-8#q=binary+image+privacy&spf=1>.

"Binary image privacy", Google, Sep. 16, 2015, 1 page [online], [retrieved on Jan. 31, 2017]. Retrieved from the Internet: <URL:https://www.google.com/webhp?sourceid=chrome-instant&ion=1&espv=2&ie=UTF-8#q=binary+image+privacy&start=20&spf=1>.

"Binary image processing infrared", Google, Sep. 16, 2015, 2 pages [online], [retrieved on Jan. 31, 2017]. Retrieved from the Internet: <URL:https://www.google.com/search?tbm=pts&hl=en&q=binary+image+processing+infrared&gws_rd=ssl>.

"Binary image processing infrared", Google, Sep. 16, 2015, 2 pages [online], [retrieved on Apr. 20, 2017]. Retrieved from the Internet: <URL:https://www.google.com/search?tbm=pts&hl=en&q=binary+image+processing+infrared&gws_rd=ssl#q=binary+image+processing+infrared&hl=en&tbm=pts&start=10&spf=1>.

"Binary image processing infrared security", Google, Sep. 16, 2015, 2 pages [online], [retrieved on Jan. 31, 2017]. Retrieved from the Internet: <URL:https://www.google.com/search?tbm=pts&hl=en&q=binary+image+processing+infrared&gws_rd=ssl#hl=en&tbm=pts&q=binary+image+processing+infrared+security&spf=1>.

* cited by examiner

SYSTEMS AND METHODS FOR BEHAVIORAL BASED ALARMS

CROSS-REFERENCE TO RELATED APPLICATIONS

This application claims the benefit of and priority to U.S. Provisional Patent Application No. 62/287,336 filed Jan. 26, 2016 and entitled "Systems and Methods for Behavioral Based Alarms", which is incorporated herein by reference in its entirety.

TECHNICAL FIELD

One or more embodiments of the invention relate generally to imaging devices and more particularly to, for example, monitoring devices and alarm systems.

BACKGROUND

Modern homes often include automated systems and monitoring equipment. However, while such systems often make home life more convenient, systems that result in a safer environment is needed.

SUMMARY

Systems and methods are disclosed herein for providing a monitoring and alarm imaging device. In certain embodiments, a system may be disclosed. The system may include a first camera configured to acquire a plurality of first image frames of at least a first scene and output first image data and a controller communicatively connected to the first camera and configured to analyze the first image data, determine a presence of an object of interest within at least one image frame, generate a historical movement pattern of the object within the first scene, compare a recent movement pattern of the object to the historical movement pattern of the object, and determine, responsive to the comparison, that an anomalous trigger condition has been met.

In certain other embodiments, a method may be provided. The method may include analyzing first image data of a first scene from a first camera, determining a presence of an object of interest within at least one image frame of the first image data, generating a historical movement pattern of the object within the first scene, comparing a recent movement pattern of the object to the historical movement pattern of the object, and determining, responsive to the comparison, that an anomalous trigger condition has been met.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments to monitor a scene and/or area. Certain embodiments may include a plurality of cameras. The one or more cameras may output data of the scene and/or area to a controller and the controller may create a behavioral model associated with one or more objects imaged by the one or more cameras. The objects may be, for example, a human, an animal, or another mobile object. The controller may then continue to monitor the scene and/or area via the one or more cameras and may detect anomalous behavior. If the controller detects anomalous behavior, it may generate an alarm or a communications to determine if the situation is indicative of an emergency situation or another such situation where help may be needed. If no acceptable response is received after the communications is generated, the controller may then generate the alarm.

Figure 1:
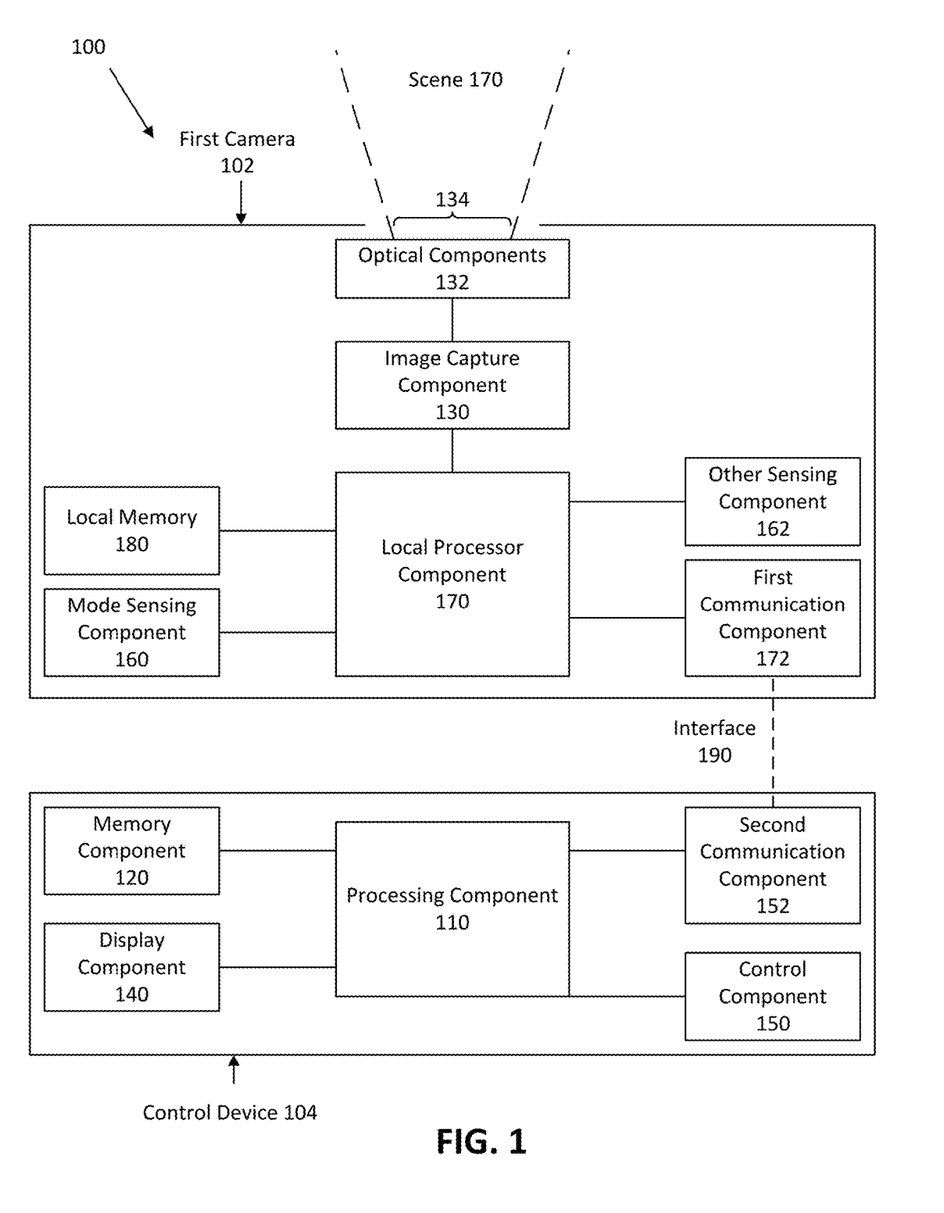
FIG. 1 illustrates a block diagram of a monitoring and alarm imaging system in accordance with an embodiment of the disclosure.

FIG. 1 illustrates a block diagram of a monitoring and alarm imaging system in accordance with an embodiment of the disclosure. Imaging system 100 in FIG. 1 may be used to capture and process image frames in accordance with various techniques described herein.

Imaging system 100 includes components distributed over one or multiple devices. In particular, imaging system 100 includes a first camera 102 and a control device 104 in communication with the first camera 102. Other embodiments may distribute the components to devices in other ways and may, in addition, distribute the components to one or a plurality of devices. Some such embodiments may distribute one, some, or all of the components of imaging system 100 over the cloud. Thus, in those embodiments, image processing may be performed over the cloud, using one or multiple cloud devices, by sending image data over the cloud. Once the image has been processed, the image may be displayed, stored, or sent back to a user device and displayed or stored on the user device. In various embodiments, either the first camera 102 and/or the control device 104 may be a camera, a camera suite, a sensor suite, a smartphone, a computer, a server, a tablet, or another type of electronic device.

In certain embodiments, the first camera 102 and the control device 104 may be coupled together. That is, the first camera 102 may be a camera attachment that may be fitted or communicatively connected (e.g., via Bluetooth) to the control device 104. The control device 104 may run an application that performs at least a portion of an image processing procedure. In such an embodiment, the control device 104 may be a smartphone, a tablet, a computer, or another type of electronic device that may receive the camera attachment. In certain embodiments, the camera attachment may be fitted via connectors such as USB or Lightning Cable connectors. Other embodiments may connect the first camera 102 and the control device 104 through a network connection, such as via Bluetooth, the internet, Near Field Communications ("NFC"), Local Area Network ("LAN"), or other network connections.

In one embodiment, the first camera 102 includes a local processor component 170, a local memory 180, an image capture component 130, optical components 132, a first communication component 172, a mode sensing component 160, and an other sensing component 162. The control device 104 may include a processing component 110, a memory component 120, a display component 140, a second communication component 152, and a control component 150.

In various embodiments, the first camera 102 may be implemented as an imaging device, such as a camera, to capture image frames of, for example, a scene 170 (e.g., a field of view). The first camera 102 may represent any type of camera which, for example, detects electromagnetic radiation (e.g., irradiance), visual images, and/or senses depth and provides representative data (e.g., one or more still image frames or video image frames). For example, the first camera 102 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a wall, a kitchen counter, a light fixture, a home security mount, a campsite or outdoors mount, or other location) via one or more types of mounts. In still another example, the first camera 102 may be integrated as part of a non-mobile installation to provide image frames to be stored and/or displayed.

The local processor component 170 and/or the processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. The local processor component 170 may be adapted to interface and communicate with components 130, 160, 162, 172, and 180 to perform method and processing steps as described herein. The processing component 110 may be adapted to interface and communicate with components 120, 140, 150, and 152.

Additionally, the local processor component 170 may be adapted to receive image signals from image capture component 130, process image signals (e.g., to provide processed image data), store image signals or image data in local memory 180, and/or retrieve stored image signals from local memory 180. Certain embodiments of the first camera 102 may include a plurality of image capture components. Such embodiments may capture multiple scenes and/or capture one or more scenes in different formats (e.g., in a combination of visual, infrared, depth, and/or other formats) and the local processor component 170 and/or the processing component 110 may then create a composite image out of the multiple scenes captured by the plurality of image capture components. The local processor component 170 may also communicate data, via the device communication component 172, to the control device 104. The device communication component 172 may communicate with the control device 104 via an interface 190 established between the device communication component 172 and a communication component 152 of the first camera 102. In various embodiments, the interface 190 may be a Bluetooth link, a WiFi link, a NFC link, a wired connection, or another type of link between the first camera 102 and the control device 104.

In certain embodiments, processing component 110 may be adapted to receive image signals from the image capture component 130 for a period of time or may continuously receive image signals. The processing component 110 may then generate a historical movement pattern from the image signals. The historical movement pattern may, for example, track movement of an object such as a human, a pet, and another mobile object within the scene 170. The historical movement pattern may include data associated with, for example, the percentage of movement over one or more movement paths within the scene 170, the percentage of time the object is positioned within an area and/or location within the scene 170, the average time that the object is stationary, the average speed at which the object moves through one or more locations or zones within the scene 170, the typical posture and/or positioning of the object within one or more locations or zones, the average time that the object remains in one or more locations or zones, classification of environmental features (e.g., sofas, kitchen islands, televisions, rugs, and other features), and data associated with other features of the scene 170.

The processing component 110 may also be adapted to compare current or recent movements of the object with the historical movement pattern. In certain embodiments, the processing component 110 may identify anomalous movement and/or positioning of the object. For example, the processing component 110 may determine that, according to the historical movement pattern, the object is currently positioned within a low traffic area for a period of time higher than a threshold period of time. As such, the object, that may be a person, may have fallen over and needs help. The processing component 110 may additionally process the image signals and determine, for example, that the object is curled up, slumped over, or in another position that suggests that the object has fallen over and needs help. Additionally, the processing component 110 may also be adapted to determine, alternatively, that the object is, for example, exercising in the area and so does not need help. As such the processing component 110 may be adapted to determine whether one or more objects identified within an image or images captured by the image capture component 130 requires help. The processing component 110 may then communicate a response message and determine if an appropriate response is obtained to the message and/or trigger an alarm such as a call for help.

The local memory 180 and/or the memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 and/or the local processor component 170 is adapted to execute software stored in the memory component 120 and/or the local memory 180, respectively, to perform various methods, processes, and modes of operations in manner as described herein.

Image capture component 130 includes, in one embodiment, one or more sensors (e.g., any type visible light, infrared, depth, or other type of detector, including a detector implemented as part of a focal plane array) for capturing image signals representative of an image, of scene 170. In one embodiment, the sensors of image capture component 130 (e.g., an infrared sensor) provide for representing (e.g., converting) a captured thermal or radiometric image signal of scene 170 as digital data (e.g., via an analog-to-digital converter included as part of the sensor or separate from the sensor as part of imaging system 100A). The image capture component 130 may be, for example, a bolometer based imaging apparatus (e.g., the image capture component 130 may be an array of sensors), a visual imaging apparatus, or another type of imaging apparatus.

Optical components 132 may include one or more lenses configured to receive electromagnetic radiation through an aperture 134 in housing 101 and pass the electromagnetic radiation to image capture component 130. Additionally, optical components 132 may include one or more filters (e.g., warm filters, bandpass filters, low pass filters, high pass filters, notch filters, and/or other optical filters) to filter electromagnetic radiation before the radiation reaches the image capture component 130. In certain other embodiments, alternatively or in addition to filters located in front of the electromagnetic radiation, processing component 110 may be configured to filter images captured by the image capture component 130 with, for example, software within processing component 110. In certain other embodiments, the optical filters (e.g., warm filters, bandpass filters, low pass filters, high pass filters, notch filters, and/or other optical filters) may be integrated within the image capture component 130. For embodiments where the image capture component 130 is an array, the optical filters may be integrated within each sensor of the array and/or integrated as one or more optical filters covering a plurality of sensors.

The local processor component 170 or the processing component 110 (via the interface 190) may be adapted to receive image signals from the image capture component 130, process image signals (e.g., to provide processed image data), store image signals or image data in the local memory 180 or the memory component 120, and/or retrieve stored image signals from the respective memories. Image data, either high dynamic range image data or low dynamic range image data, may be transferred between the first camera 102 and the control device 104 between the interface 190. In certain embodiments, the image data transferred may be compressed image data. Processing component 110 may be adapted to process image signals received to provide image data (e.g., reconstructed image data) to the display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140 that the processing component 110 retrieved from the memory component 120, processed from image data received via the interface 190, or processed from any other source. Display component 140 may include display electronics, which may be utilized by processing component 110 to display image data and information. Display component 140 may receive image data and information directly from image capture component 130 via the interface 190, from the local processor component 170 via the interface 190, or the image data and information may be transferred from memory component 120.

In various aspects, display component 140 may be remotely positioned (e.g., housed in a separate housing) from the image capture component 130, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100A, such as auto-focus, menu enable and selection, field of view (FoV), brightness, contrast, gain, offset, spatial, temporal, and/or various other features and/or parameters. In other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

In certain embodiments, the first camera 102 may include the control component 150 and/or the display component 140 instead of or in addition to the control device 104. It is appreciated that the various components described herein may be included on either or both of the first camera 102 and the control device 104.

Mode sensing component 160 includes, in one embodiment, an application sensor adapted to automatically sense a mode of operation, depending on the sensed application (e.g., intended use or implementation), and provide related information to the local processor component 170 and/or the processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system 100's intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Mode sensing component 160, in one embodiment, may include a mechanical locking mechanism adapted to secure the imaging system 100 to an object and may include a sensor adapted to provide a sensing signal to processing component 110 when the imaging system 100 is mounted and/or secured to the object. Mode sensing component 160, in one embodiment, may be adapted to receive an electrical signal and/or sense an electrical connection type and/or mechanical mount type and provide a sensing signal to processing component 110. Alternatively or additionally, as discussed herein for one or more embodiments, a user may provide a user input via control component 150 (e.g., a wireless touch screen of display component 140) to designate the desired mode (e.g., application) of imaging system 100.

Processing component 110 and/or local processor component 170 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100). In certain embodiments, a component may communicate with another component via the interface 190.

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 162 may include one or more conventional sensors as would be known by those skilled in the art for monitoring various conditions (e.g., environmental conditions) that may have an effect (e.g., on the image appearance) on the data provided by image capture component 130. The other sensing components 162 may be located on the first camera 102, as shown in FIG. 1, on the control device 104, on both the first camera 102 and the control device 104, or, alternatively or additionally, on another device separate from the first camera 102 and the control device 104.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 and/or device communication component 172 may be implemented as a network interface component (NIC) adapted for communication with a network including other devices in the network. In various embodiments, communication component 152 and/or device communication component 172 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 and/or device communication component 172 may include an antenna coupled thereto for wireless communication purposes. In other embodiments, the communication component 152 and/or device communication component 172 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network. The communication component 172 communication component 152 may send radiometric thermal images or video over the interface 190 to the communication component 152.

Figure 2:
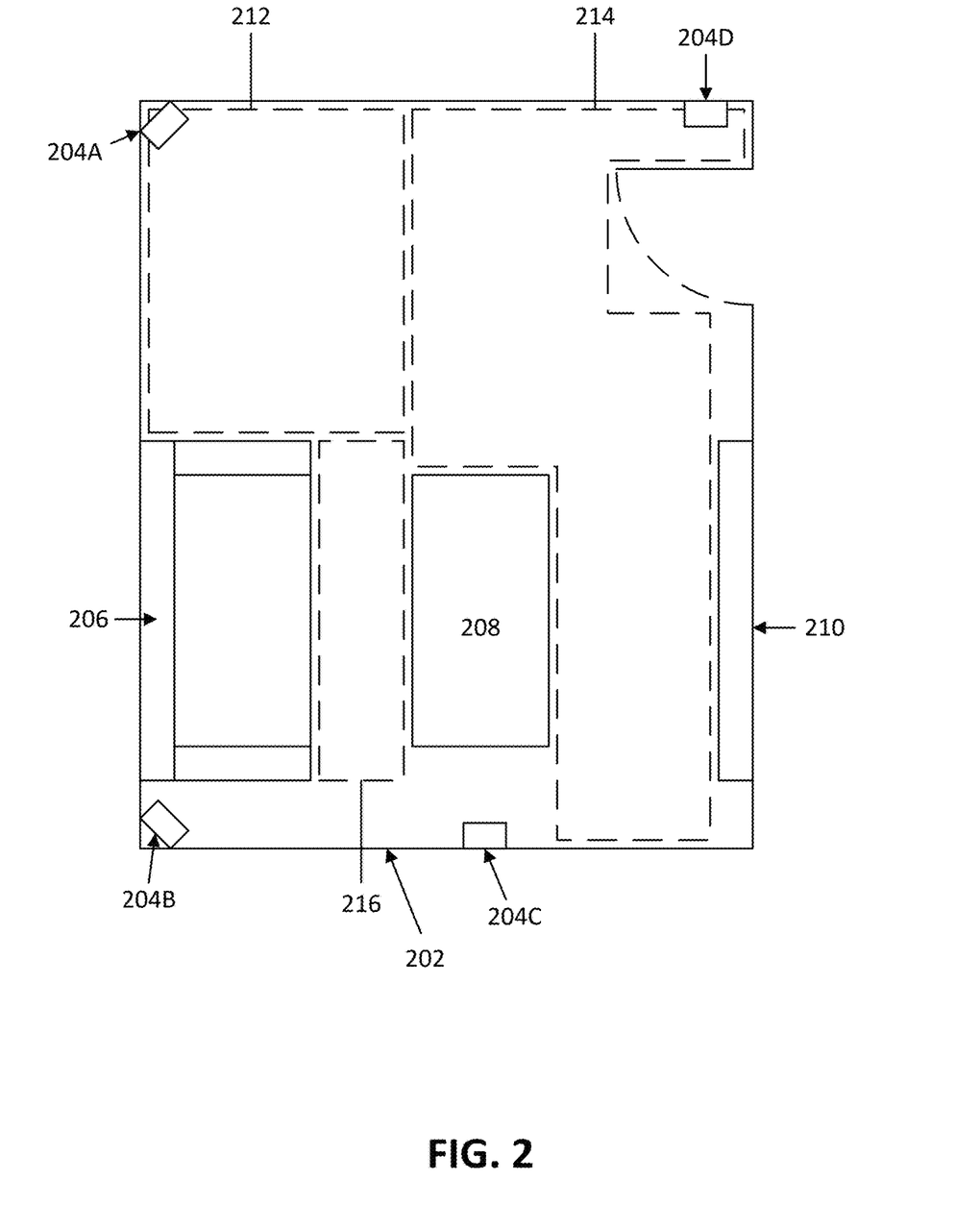
FIG. 2 illustrates a monitoring and alarm system installed within a room in accordance with an embodiment of the disclosure.

FIG. 2 illustrates a monitoring and alarm system installed within a room in accordance with an embodiment of the disclosure. FIG. 2 shows a room 202 with cameras 204A-D installed in various positions within the room 202. The cameras 204A-D may be positioned around various parts of the room to maximize the areas imaged and may be communicatively connected to a controller. The controller may receive data from the various cameras 204A-D and determine a historical movement pattern from the data of the cameras 204A-D.

Additionally, the room 202 may include environmental features (e.g., features of the area being imaged that are relatively unchanging) including a sofa 206, a table 208, and a television 210. The controller may determine that the sofa 206, the table 208, and/or the television 210 are environmental features due to their immobility. Additionally, the controller may determine, from features such as the height, positioning, interactions of the object with the environmental features, and other factors, the category of each of the environmental features. As such, the controller may, for example, determine that due to the object (e.g., human or animal) being periodically positioned atop the sofa 206 in a manner indicative of sitting, that the sofa 206 is, in fact, a sofa. The controller may determine the category of the other environmental features through other such techniques.

The controller may also determine areas of interest within the room 202. As such, the controller may, for example, divide the room 202 into one or more regions. For example, in FIG. 2, the controller may have divided the room 202 into regions 212, 214, and 216, as well as possibly other regions. The regions 212, 214, and/or 216 may have associated probabilities related towards the percentage of time that an object, if detected by one or more of the cameras 204A-D, spends within the regions 212, 214, and/or 216. Additionally, the regions 212, 214, and/or 216 may also include associated data related towards, for example, average movement speed of the object within the regions 212, 214, and/or 216, average dwell time of the object within the regions 212, 214, and/or 216, a typical posture of the object within the regions 212, 214, and/or 216, a typical orientation of the object within the regions 212, 214, and/or 216, and/or data related towards other aspects. The controller may then determine that, if an object is interacting within the regions 212, 214, and/or 216 in a manner outside of a threshold, to output an alarm or a response message (e.g., an audible message such as "are you okay?" or a message communicated to, for example, a phone of the user being tracked).

For example, the controller may determine that the object typically spends less than 15 seconds within the region 212. As such, if the controller determines that the object has, in a certain situation, spent over 5 minutes within the region 212, the controller may output an alarm or response message. However, if the controller determines that the object is in an exercising position (e.g., in a prone position suggestive of doing push-ups), the controller may then determine that no alarm or response message is required to be outputted.

In another example, the cameras 204A-D may, for example, detect that the object moved to a position behind the table 208 ten minutes ago, but has not been detected since. The controller may then determine that, due to the size of the table 208 and the size of the object, that the object is likely to be lying behind the table. Such a determination may be characteristic of the object collapsing behind the table and so the controller may then output an alarm or a response message. In certain such examples, the controller may determine, for example, that the object is often lying behind the table when the television 210 is turned on. In such an example, the controller may then determine that the object often watches television in such a position and so may not output an alarm or a response message if it determines that the object is lying behind the table.

The controller may also be adapted to determine and differentiate between different environmental features. As such, the controller may classify the sofa 206 as an environmental feature for sitting or laying on and may classify the table 208 as an environmental feature for placing items on. Accordingly, if the controller determines that the object is lying on the sofa 206, the controller may not output an alarm or a response message, but if the controller determines that the object is lying on the table 208, it may determine that the table 208 is not a normal place for the object to lie on and thus output an alarm or a response message. Additionally, the controller may also track the time that an object spends in one location or posture. As such, if the controller may determine that the object typically lays on the sofa 206 for naps of between 30 minutes to an hour and detects that the object in the current instance has laid on the sofa 206 for over 4 hours, it may output an alarm or a response message. Various other embodiments may thus determine the amount of time that the object has remained in one position and/or the category of the position that the object is remaining in (e.g., whether the area is a low or high traffic area and/or whether the object typically remains in the area for a short or long period of time) and then determine whether the object has remained within the area past a threshold period of time. If the object has remained past a threshold period of time, a response message and/or an alarm may be outputted.

In certain other embodiments, the controller may, in addition to detecting the object within the room 202, also determine when the object is outside of the room 202. As such, the controller may, for example, determine that an exit to the room 202 leads into a bathroom. If the controller determines that the object has exited the room 202 into the bathroom and has remained within the bathroom for a period of time longer than a threshold period of time (e.g., longer than an hour or more), an alarm or a response message may be outputted.

Figure 3:
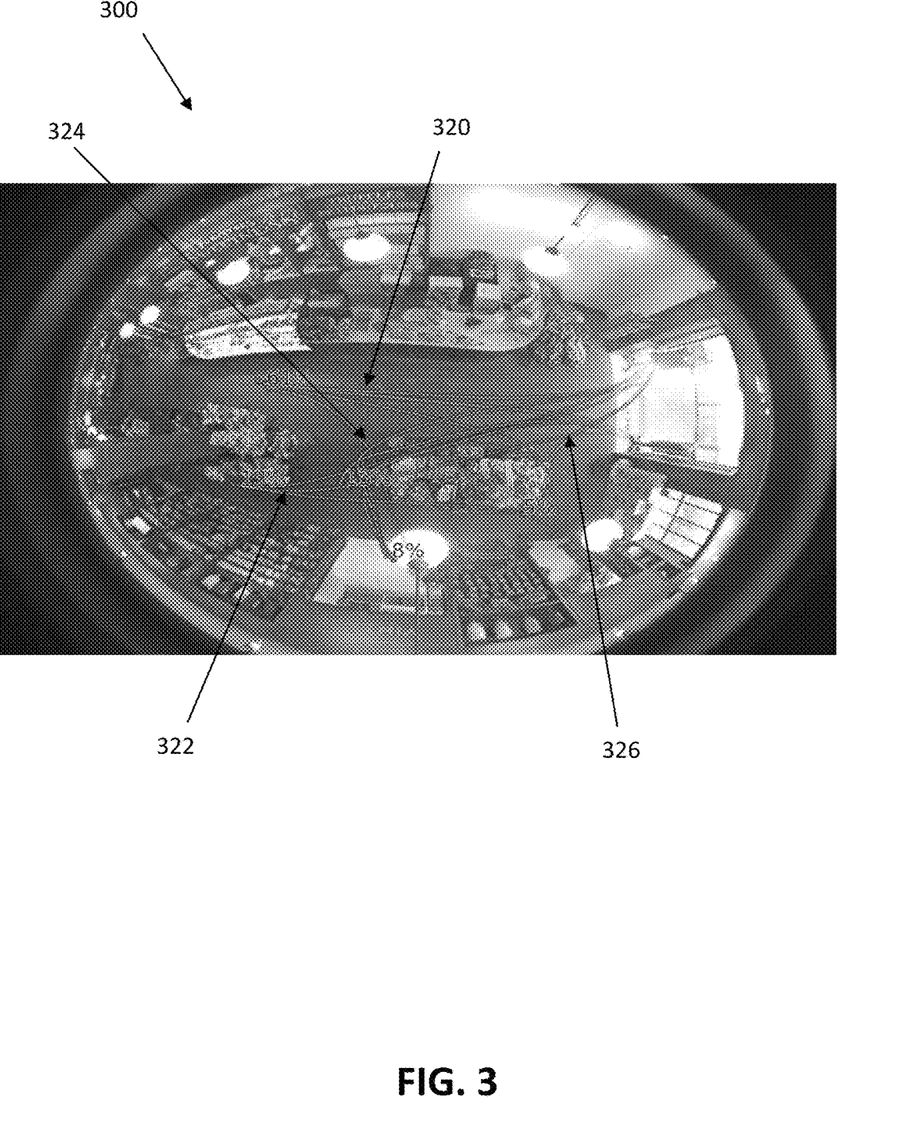
FIG. 3 illustrates a historical movement pattern generated by a monitoring and alarm system in accordance with an embodiment of the disclosure.

FIG. 3 illustrates a historical movement pattern generated by a monitoring and alarm system in accordance with an embodiment of the disclosure. Historical movement pattern 300 may include movement paths 320, 322, 324, and 326. Each of the movement paths 320, 322, 324, and 326 may include a movement likelihood associated with the movement path. The movement likelihood may be associated with a percentage and/or frequency that the object travels the movement path. For example, the movement path 320 includes an associated percentage of 61%, indicating that 61% of the time the object travels within the area shown by the historical movement pattern 300, it travels on the movement path 320. Additionally, the movement paths 322 and 324 include associated percentages of 13% each and the movement path 326 includes an associated percentage of 5%.

The historical movement pattern 300 may be a graphic or representation that may be adapted to be displayed on a graphical display. In certain embodiments, the historical movement pattern 300 may, alternative or additional to displaying the associated percentage as a numerical percentage, also represent the associated percentages as colors or other graphics.

Figure 4A:
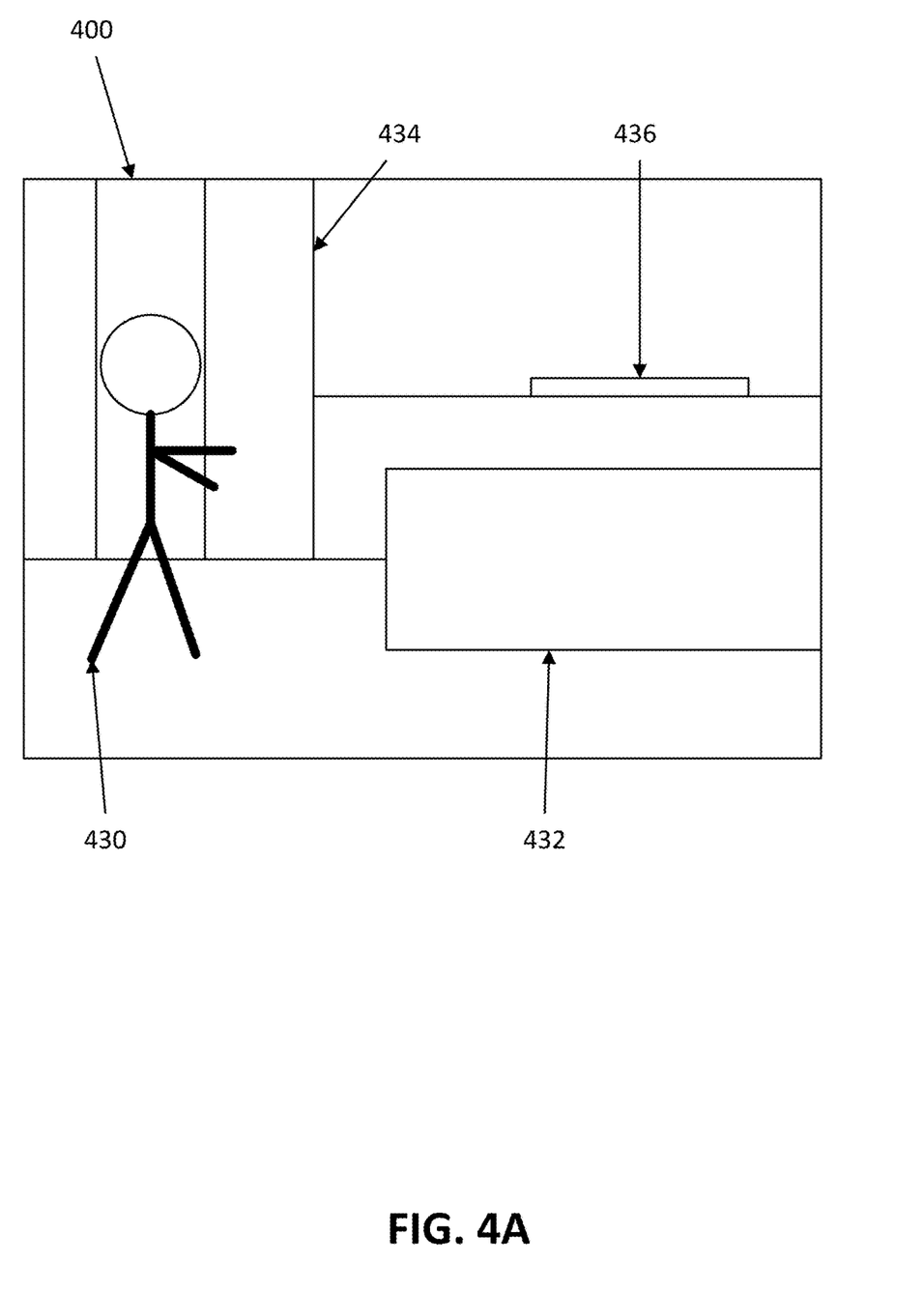
FIG. 4A illustrates a situation tracked by a monitoring and alarm system in accordance with an embodiment of the disclosure.

FIG. 4A illustrates a situation tracked by a monitoring and alarm system in accordance with an embodiment of the disclosure. FIG. 4A includes a scene 400 that may be imaged by a camera. The scene 400 may include an object 430 that may be a person, and environmental features including a kitchen island 432, a refrigerator 434, and a stove 436.

The controller may detect the object 430 within the scene 400 and determine that the object 430 is upright and within a walking posture. As such, the controller may determine that the object 430 may be in a good physical condition and thus may not output an alarm or response message. The controller may accordingly be adapted to determine a posture of the object. For example, the controller may determine an aspect ratio of the object 430 and compare the aspect ratio to a determined size of the object 430. As such, the controller may, according to the aspect ratio, determine the position of the object 430 (e.g., lying down, standing up, sitting, crouched, and other positions).

In a subsequent frame, the object 430 may have disappeared. The controller may then determine that, according to the object 430's posture and last point of detection, that the object 430 may be hidden behind the kitchen island 432. If the controller determines that object 430 has been hidden from view behind the kitchen island 432 past a threshold time period, the controller may then output an alarm or response message. In other embodiments, the controller may detect the object 430, but may, for example, determine that the object 430 is lying on the floor and, accordingly, output an alarm or response message.

In certain embodiments, the controller may also determine that a door of the refrigerator 434 may be open for a period of time past a refrigerator open time threshold or that the stove 436 has been on without cooking anything for a period of time past a stove on time threshold and additionally output one or more alarms and/or response messages due to such determinations. Also, the controller may determine that the object 430 may remain in front of the stove 436 for a longer period of time than the refrigerator 434 when the refrigerator 434 is open, as typically refrigerator door opening times are minimized.

In such embodiments, the alarms and/or response messages associated with the determination that the refrigerator 434 is open or that the stove 436 is on may be alarms and/or response messages different alarms and/or response messages associated with a poor physical condition of the object 430. For example, if the controller determines that the object 430 is in a poor physical condition, it may call an emergency medical service such as 911, a hospital, or a caretaker, while if the controller determines that the refrigerator 434 is open or that the stove 436 is on, a message may be sent to an electronic device of the object 430 reminding the object 430, a person, to close the refrigerator 434 or turn off the stove 436.

Other embodiments of the monitoring and alarm system may be adapted for use in other areas. As such, while embodiments for normal rooms and kitchens are described herein, other embodiments may be adapted for use within bathrooms, garages, offices, dens, bedrooms, and/or other areas. For example, a bathroom embodiment may determine that objects may dwell before mirrors and/or bathroom sinks and thus may allow for extra time of remaining before mirrors and/or bathroom sinks before an alarm or response message is outputted. Additionally, the controller may also determine, for example, a time of day or other environmental condition. As such, the controller may determine that during the day, the object 430 may not remain in bed for a long period of time after it has left the bed unless physical discomfort is experienced, but during nighttime, the object 430 may remain within the bed for an extended period of time for sleeping.

Figure 4B:
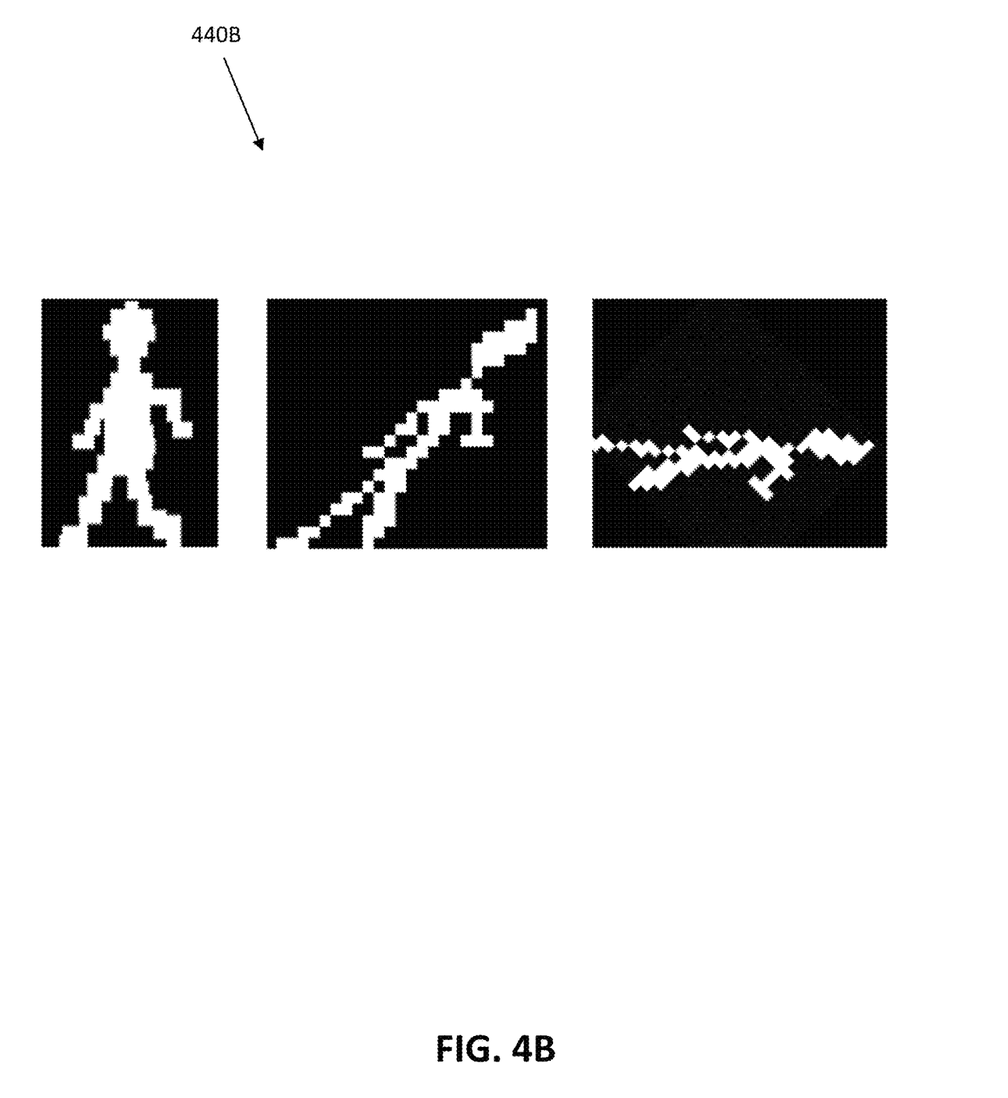
FIG. 4B illustrates a possible image representation of a person monitored by the monitoring and alarm system in accordance with an embodiment of the disclosure.

FIG. 4B illustrates a possible image representation of a person monitored by the monitoring and alarm system in accordance with an embodiment of the disclosure. In certain such embodiments, a representation of a scene and/or a detected object may be generated (e.g., on a display or through another such technique for communication to a user, operator, controller, and/or other entity).

FIG. 4B may illustrate an embodiment of the monitoring and alarm system that may convert data from, for example, cameras 204A-D, to one or more image representations such as binary images. In certain such embodiments, image capture component 130, local processor component 170, processing component 110, and/or other components of imaging system 100A may process the captured images to binary images. In certain embodiments, binary images may be images without detail features (e.g., facial features, body features, and/or other such features) and/or may be images without surrounding objects (e.g., furniture, trees, buildings, and/or other such objects). Such binary images may be created through the application of one or more masks to the image data captured by the cameras and/or other such techniques such as segmentation, thresholding, and/or dithering. Certain such embodiments may associate the creation of binary images with object recognition. As such, for example, a person and/or portion thereof may be recognized and may be rendered and/or highlighted as one portion of the binary image and/or may be rendered as one possible pixel value, while other parts of the image may be rendered as another pixel value. Certain embodiments may render detected objects according to one or more techniques. Binary images may lead to improved object detection, allow for greater privacy, and allow for improved tracking.

FIG. 4B illustrates a binary shape imaging embodiment. FIG. 4B may be a binary imaging embodiment that may render a detected object and/or person in an outline format and/or in a generic outline format (e.g., a detected person may be rendered as a generic person graphic and/or a detected table may be rendered as a generic table graphic). The image in FIG. 4B may be rendered through any suitable binary imaging techniques.

In certain embodiments, an orientation and/or position of the object and/or person may be detected. For example, as shown in FIG. 4B, a person may be detected and rendered in a binary outline format and/or as a binary generic person graphic. The orientation and/or position of the person may also be detected. For example, the person may be detected to be in at least the standing/walking, leaning, falling, and/or fallen positions. Other embodiments may also detect the person to be sitting, lying down, squatting, crouching, running, slouching, and/or other appropriate positions.

In certain embodiments, the binary outline format may be black and white and/or gray scale, while other embodiments may include colored binary outlines. Gray scale and/or colored binary outlines may allow for differentiation between multiple detected objects of the same type. As such, different persons may be rendered in different colors and/or different shadings. In other embodiments, a determination may be made as to a possible level of threat (e.g., to safety and/or health), a possible likelihood of requiring assistance, and/or other factor that the detected object and/or person is in (e.g., a person standing up may be determined to be in relatively low danger while a person lying on the floor may be determined to be in relatively high danger). Such possible levels may correspond to different colors and/or shadings (e.g., white may correspond to low danger while red may correspond to high danger). Using the example of FIG. 4B, the image on the left may show a person in a low level of danger as the person is standing up. The image in the middle may show a person in a medium level of danger as the person may be falling. The image on the right may show a person in a high level of danger as the person may have fallen.

Figure 4C:
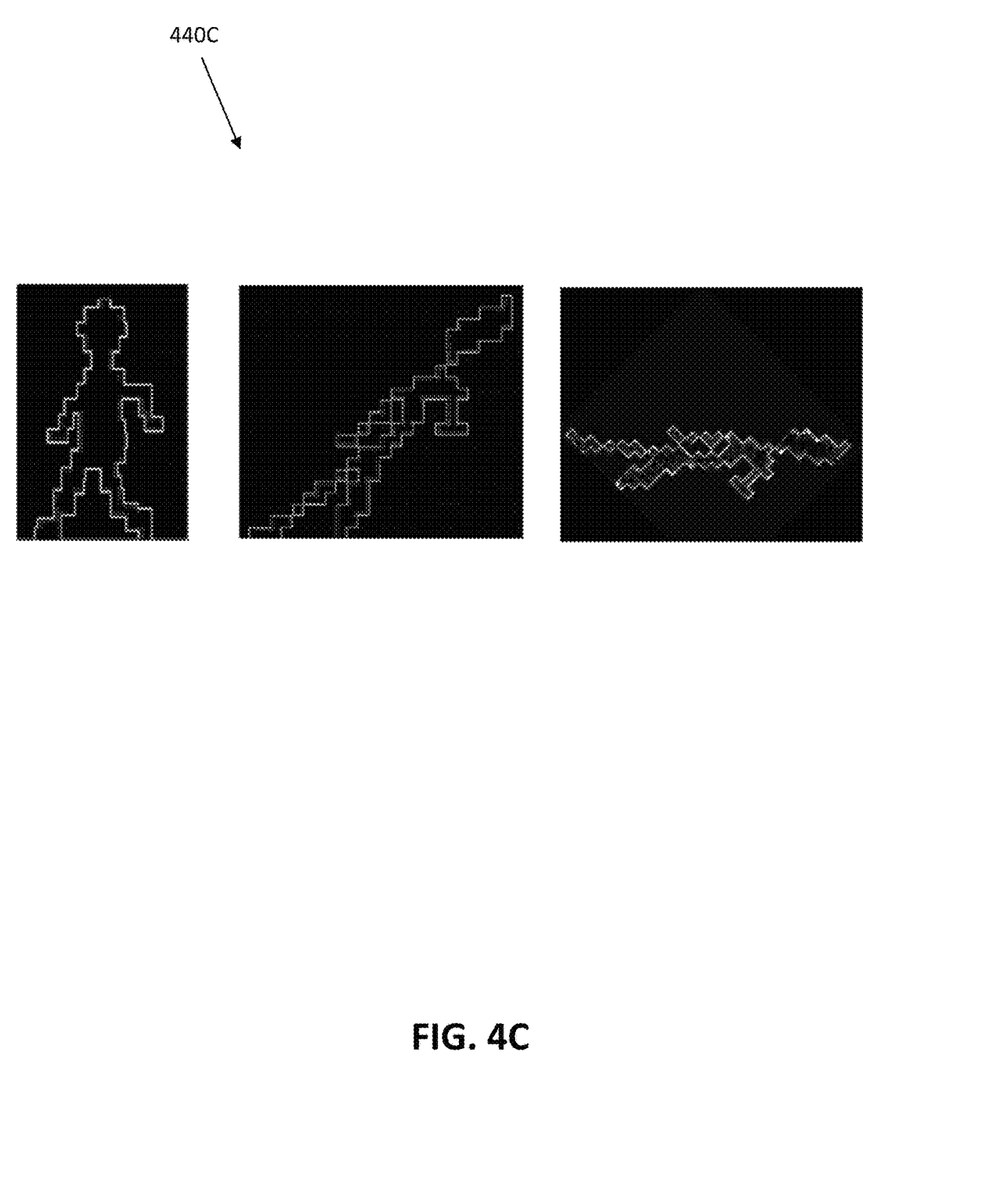
FIG. 4C illustrates another possible image representation of a person monitored by the monitoring and alarm system in accordance with an embodiment of the disclosure.

FIG. 4C illustrates another possible image representation of a person monitored by the monitoring and alarm system in accordance with an embodiment of the disclosure. FIG. 4C may show a binary imaging embodiment that may render a detected object and/or person in a silhouette format and/or in a generic silhouette format. The silhouette format may render objects only through their silhouette. Such objects may include a detected orientation, position, and/or other positioning determination and the silhouette may include graphics and/or orientations to reflect such determinations. Additionally, objects rendered in the silhouette format may be rendered in black and white, grayscale, and/or colored silhouettes.

Figure 4D:
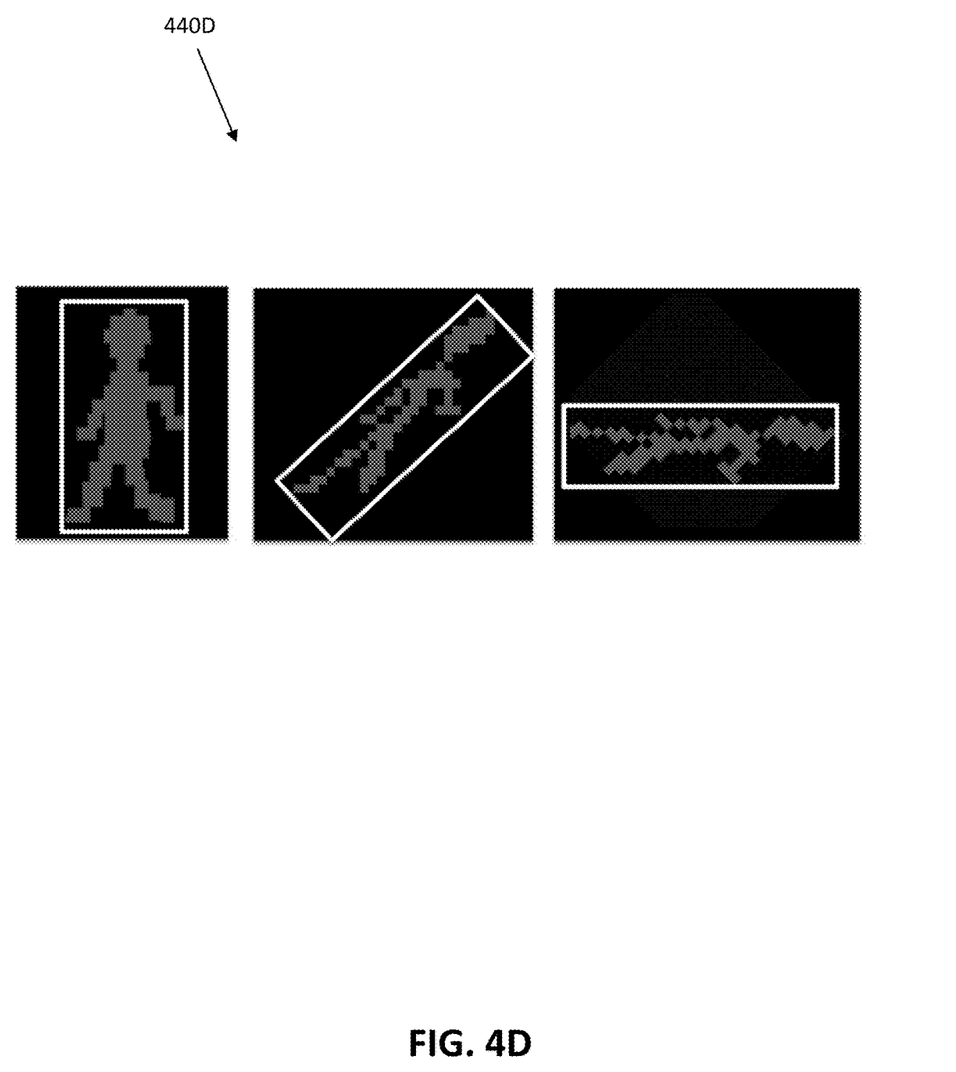
FIG. 4D illustrates yet another possible image representation of a person monitored by the monitoring and alarm system in accordance with an embodiment of the disclosure.

FIG. 4D illustrates yet another possible image representation of a person monitored by the monitoring and alarm system in accordance with an embodiment of the disclosure. FIG. 4D may show a binary imaging embodiment that may render a detected object and/or person in a box format. In certain embodiments, only objects that are determined to meet certain criteria (e.g., may be determined to be people and/or animals) may be rendered in the box format. The box format may be rendered as a generically sized box, may be rendered to fit around an outside dimension of the object, and/or may be rendered in another such technique. Such detected objects may include a detected orientation, position, and/or other positioning determination (determined from, for example, imaging data processed by the controller) and the box may be oriented and/or displayed to include information directed towards such determinations. Additionally, objects rendered in the box format may be rendered in black and white, grayscale, and/or colored boxes.

Figure 4E:
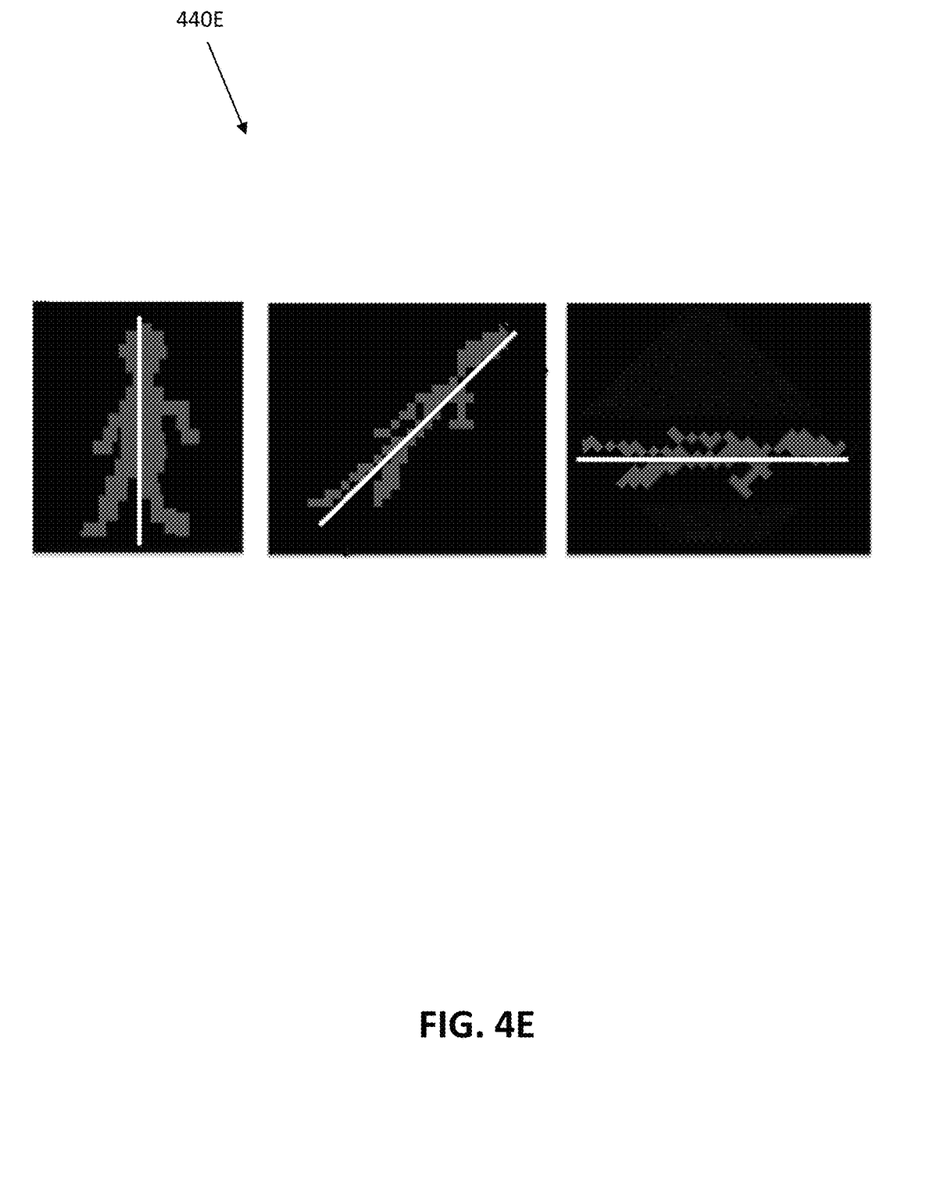
FIG. 4E illustrates an alternative image representation of a person monitored by the monitoring and alarm system in accordance with an embodiment of the disclosure.

FIG. 4E illustrates an alternative image representation of a person monitored by the monitoring and alarm system in accordance with an embodiment of the disclosure. FIG. 4E may show a binary imaging embodiment that may render a detected object and/or person in a line format. In certain embodiments, only objects that are determined to meet certain criteria (e.g., may be determined to be people and/or animals) may be rendered in the line format. The box format may be rendered as a generic length line, may be rendered to correspond to a major length and/or axis of the object (e.g., the longest length), and/or may be rendered in another such technique. Such objects may include a detected orientation, position, and/or other positioning determination and the line may be oriented and/or displayed to include information directed towards such determinations (e.g., standing, falling, leaned over, fallen, and/or other such orientations). Additionally, objects rendered in the line format may be rendered in black and white, grayscale, and/or colored lines.

Figure 5:
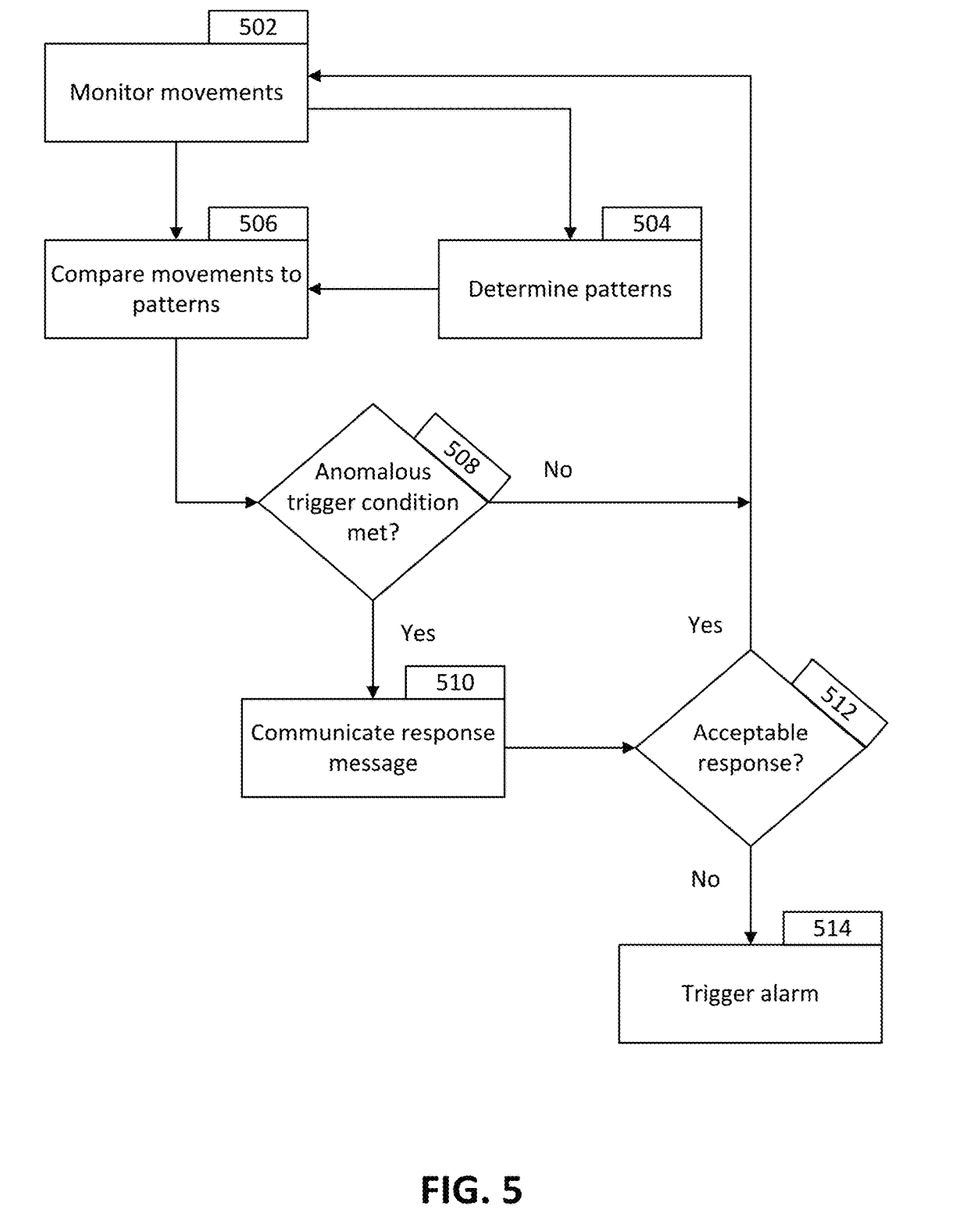
FIG. 5 illustrates a flowchart of a process of monitoring and detecting an anomalous situation with a monitoring and alarm system in accordance with an embodiment of the disclosure.

FIG. 5 illustrates a flowchart of a process of monitoring and detecting an anomalous situation with a monitoring and alarm system in accordance with an embodiment of the disclosure. In block 502, one or more cameras may monitor movement of an object. The one or more cameras may be a visual camera, a thermal camera, a depth camera (e.g., a radar or lidar based camera), or another type of camera. The camera may output data related to movement and/or positioning of the object as well as, possibly, data related to other objects, environmental features, environmental conditions, and other aspects to a controller.

In block 504, the controller may analyze the data outputted and determine patterns such as historical movement patterns, patterns related to movement and postures of the object, environmental features, and other patterns and determinations. Simultaneously or substantially simultaneously, the one or more cameras may continue monitoring.

In block 506, the current and/or recent (e.g., within the past hour, within the past three hours, within the past five hours, within the past day, and within some other time period) movement, posture, and/or other condition of the object may be compared to the historical movement patterns and other such patterns and determinations of block 504.

The controller may then determine if the current and/or recent movement, posture, and/or other condition of the object is anomalous in block 508. The controller may determine that the current and/or recent movement, posture, and/or other condition of the object is anomalous through any of the techniques described herein. Generally, anomalous conditions may be indicative of an emergency and/or physical discomfort associated with the object (e.g., a stroke, heart attack, cramp, injury, fall, or other physical problems) and the controller may determine such anomalous conditions through current and/or recent behavior of the object. If the anomalous trigger condition is met in block 508, the technique may continue to block 510. Otherwise, monitoring of the scene and/or the object may be continued in block 502. In certain embodiments, anomalous conditions may be determined and/or "learned" by the controller responsive to movement patterns and other actions of the object detected by the camera. Anomalous conditions may also be programmed into the controller in addition to or alternative to being learned.

In block 510, a response message may be communicated. The response message may be a message to determine if the object requires assistance. The response message may be, for example, an audio message (e.g., a audio message asking "are you okay?"), a message communicated to an electronic device (e.g., a text message requesting that the recipient respond), a visual message (e.g., blinking lights), or another type of message.

In block 512, the controller may determine if an adequate response has been received. If an adequate response is received to the response message, the controller may determine that no emergency exists and the technique may return to block 502 and continue monitoring of the scene and/or the object. An adequate response may be, for example, an audible response (e.g, "I'm okay"), an electronic message (e.g., a text message reply), a press of a button, or another such type of response. If an adequate response is not received, the process may continue to block 514.

In block 514, the controller may determine that the anomalous condition detected is indicative of an emergency and/or physical discomfort of the object. As such, the controller may output an alarm to obtain emergency services. The alarm may be, for example, an audible alarm, a message or call to emergency services (e.g., 911 or a hospital), a message or call to a caregiver, a message or call to a next of kin, or another technique to obtain emergency services and/or assistance.

In certain embodiments, after an alarm is outputted, the period of monitoring leading to the alarm may be saved. As such, video of any possible incidents that led to the emergency may be saved and may be used for later analysis. In certain such embodiments, such video may be automatically communicated to another source. For example, the video may be communicated to an emergency service and the emergency service may utilize the video to determine the type of assistance that the object requires.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100A may be associated with a particular network link such as for example a URL (Uniform Resource Locator), an IP (Internet Protocol) address, and/or a mobile phone number.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a first camera configured to acquire a plurality of first image frames of at least a first scene and output first image data; and
a controller configured to communicate with the first camera and configured to:
receive first period data, wherein the first period data is first image data associated with a first time period,
process the first period data to generate processed first period data of binary images,
analyze the processed first period data to determine a presence of an object of interest within at least one image frame of the processed first period data and highlight the object of interest within the at least one image frame of the processed first period data,
analyze movement of the highlighted object of interest within the at least one image frame of the processed first period data to determine a historical movement pattern of the object within the first scene,
store the historical movement pattern,
receive, after the storing the historical movement pattern, second period data, wherein the second period data is first image data associated with a second time period,
process the second period data to generate processed second period data of binary images,
analyze the processed second period data to determine a presence of the object of interest within at least one image frame of the processed second period data and highlight the object of interest within the at least one image frame of the processed second period data,
analyze movement of the highlighted object of interest within the at least one image frame of the processed second period data to determine a recent movement pattern of the object,
compare the recent movement pattern of the object to the stored historical movement pattern of the object,
determine, responsive to the comparison, that an anomalous trigger condition has been met, and
output an alarm or response message in response to determining that the anomalous trigger condition has been met.

2. The system of claim 1, further comprising a second camera communicatively connected to the controller and configured to acquire a plurality of second image frames of at least the first scene and output second image data, wherein the controller is further configured to:
receive the second image data;
analyze the second image data to determine the presence of the object of interest within at least one image frame of the processed first image data and/or the second image data, wherein generating the historical movement pattern of the object within the first scene comprises generating the historical movement pattern with the first image data and/or the second image data.

3. The system of claim 2, wherein the first camera is a thermal camera and the second camera is a visual and/or depth camera.

4. The system of claim 1, wherein the first camera is a thermal, visual, and/or depth camera.

5. The system of claim 1, wherein the historical movement pattern is associated with a presence of the object of interest within at least a plurality of image frames.

6. The system of claim 1, wherein the historical movement pattern comprises a plurality of movement paths and a likelihood associated with each of the plurality of movement paths.

7. The system of claim 1, wherein the controller is further configured to:
communicate a response message requesting a human response;
determine that no acceptable response is received responsive to the response message; and
cause an alarm to be triggered.

8. The system of claim 1, wherein comparing the recent movement pattern of the object to the historical movement pattern of the object comprises comparing a location of the object to the historical movement pattern.

9. The system of claim 1, wherein the controller is further configured to:
analyze the processed first period data to determine a first size of the object within the processed first period data; and
analyze the processed second period data to determine a second size of the object within the processed second period data, wherein comparing the recent movement pattern of the object to the historical movement pattern of the object comprises determining a posture of the object by comparing an aspect ratio of the second size to the first size.

10. The system of claim 1, wherein comparing the recent movement pattern of the object to the historical movement pattern of the object comprises determining that the object is behind an obstacle.

11. The system of claim 1, wherein comparing the recent movement pattern of the object to the historical movement pattern of the object comprises determining a dwell time of the object and comparing the dwell time to the historical movement pattern.

12. The system of claim 1, wherein generating the historical movement pattern of the object within the first scene comprises determining one or more environmental features of the first scene and comparing the recent movement pattern of the object to the historical movement pattern of the object comprises determining a location of the object relative to the one or more environment features.

13. The system of claim 1, wherein the object is a person.

14. The system of claim 1, wherein the highlighting object of interest comprises one or more of rendering the object in a pixel value different from a pixel value for rendering a background within the first scene, rendering a box around an outside dimension of the object, and rendering the object in a line format.

15. A method comprising:
receiving first period data, wherein the first period data is first image data of a first scene from a first camera associated with a first time period;
processing the first period data to generate processed first period data of binary images;
analyzing the processed first period data to determine a presence of an object of interest within at least one image frame of the processed first period data and highlighting the object of interest within the at least one image frame of the processed first period data;
analyzing movement of the highlighted object of interest within the at least one image frame of the processed first period data to determine a historical movement pattern of the object within the first scene;
storing the historical movement pattern;

receiving, after the storing the historical movement pattern, second period data, wherein the second period data is first image data associated with a second time period;
processing the second period data to generate processed second period data of binary images;
analyzing the processed second period data to determine a presence of the object of interest within at least one image frame of the processed second period data and highlighting the object of interest within the at least one image frame of the processed second period data;
analyzing movement of the highlighted object of interest within the at least one image frame of the processed second period data to determine a recent movement pattern of the object;
comparing the recent movement pattern of the object to the stored historical movement pattern of the object;
determining, responsive to the comparison, that an anomalous trigger condition has been met; and
outputting an alarm or response message in response to determining that the anomalous trigger condition has been met.

16. The method of claim 15, further comprising:
receiving second image data of the first scene from a second camera;
analyzing the second image data to determine the presence of the object of interest within at least one image frame of the processed first image data and/or the second image data, wherein generating the historical movement pattern of the object within the first scene comprises generating the historical movement pattern with the first image data and/or the second image data.

17. The method of claim 15, wherein the historical movement pattern is associated with a presence of the object of interest within at least a plurality of image frames.

18. The method of claim 15, wherein the historical movement pattern comprises a plurality of movement paths and a likelihood associated with each of the plurality of movement paths.

19. The method of claim 15, further comprising:
communicating a response message requesting a human response;
determining that no acceptable response is received responsive to the response message; and
causing an alarm to be triggered.

20. The method of claim 15, further comprising:
analyzing the processed first period data to determine a size of the object, wherein comparing the recent movement pattern of the object to the historical movement pattern of the object comprises
determining a posture of the object by comparing an aspect ratio of the object to the determined size of the object.

* * * * *